May 7, 1968 M. F. MAULE 3,382,019

PHONOGRAPH RECORD HOLDER

Filed Jan. 31, 1967 2 Sheets-Sheet 1

INVENTOR.
Michael F. Maule

BY Philip G. Hilbert

ATTORNEY

United States Patent Office 3,382,019
Patented May 7, 1968

3,382,019

PHONOGRAPH RECORD HOLDER

Michael F. Maule, 139 E. 63rd St., New York, N.Y. 10021

Filed Jan. 31, 1967, Ser. No. 612,976
8 Claims. (Cl. 312—11)

ABSTRACT OF THE DISCLOSURE

A phonograph record holder of the compartment type arranged for rotation and of a frame structure which facilitates access to the compartments and viewing the contents thereof.

*Background of the invention*

This invention relates to holders for the storage and retrieval of phonograph records encased in their usual envelopes or albums; the holder being rotatable about a horizontal axis and including radial compartments for storing the records.

Conventionally, phonograph records are stored in open, vertically stacked relation in closets or the like; or in storage cabinets designed for that purpose. In either case, the individual records in their envelopes or albums are in side by side contacting relation, which presents great difficulty in identifying individual records for selection thereof.

Thus, known record storage and retrieval means greatly impairs the enjoyment of such records because of the awkward and inconvenient efforts necessary to select from a record library, the desired record or records.

Accordingly, the phonograph record holder of the instant invention, which is of simple, economical construction, greatly simplifies the selection of a desired record from a number of stored records, allowing for quick identification of any of the stored records with a minimum amount of physical effort.

Further, the phonograph record holder embodying the instant invention, comprises a rotatable compartmented structure which can be easily rotated to bring any compartment thereof to a readily accessible position; the compartments having a configuration which permits the record contents thereof to be moved relative to each other while still in the compartment, to facilitate the ready identification of each of the records.

*Summary*

The instant invention is directed to a phonograph record holder which comprises an openwork frame structure arranged for rotation about a horizontal axis on a suitable support; the frame structure including radial compartments for storing records in their usual envelopes or albums; the radial compartments allowing the individual records therein to be angularly displaced relative to each other so that the individual records may be easily and quickly identified for selection and removal from the compartments.

*Description of the preferred embodiment*

Figures 1, 2:
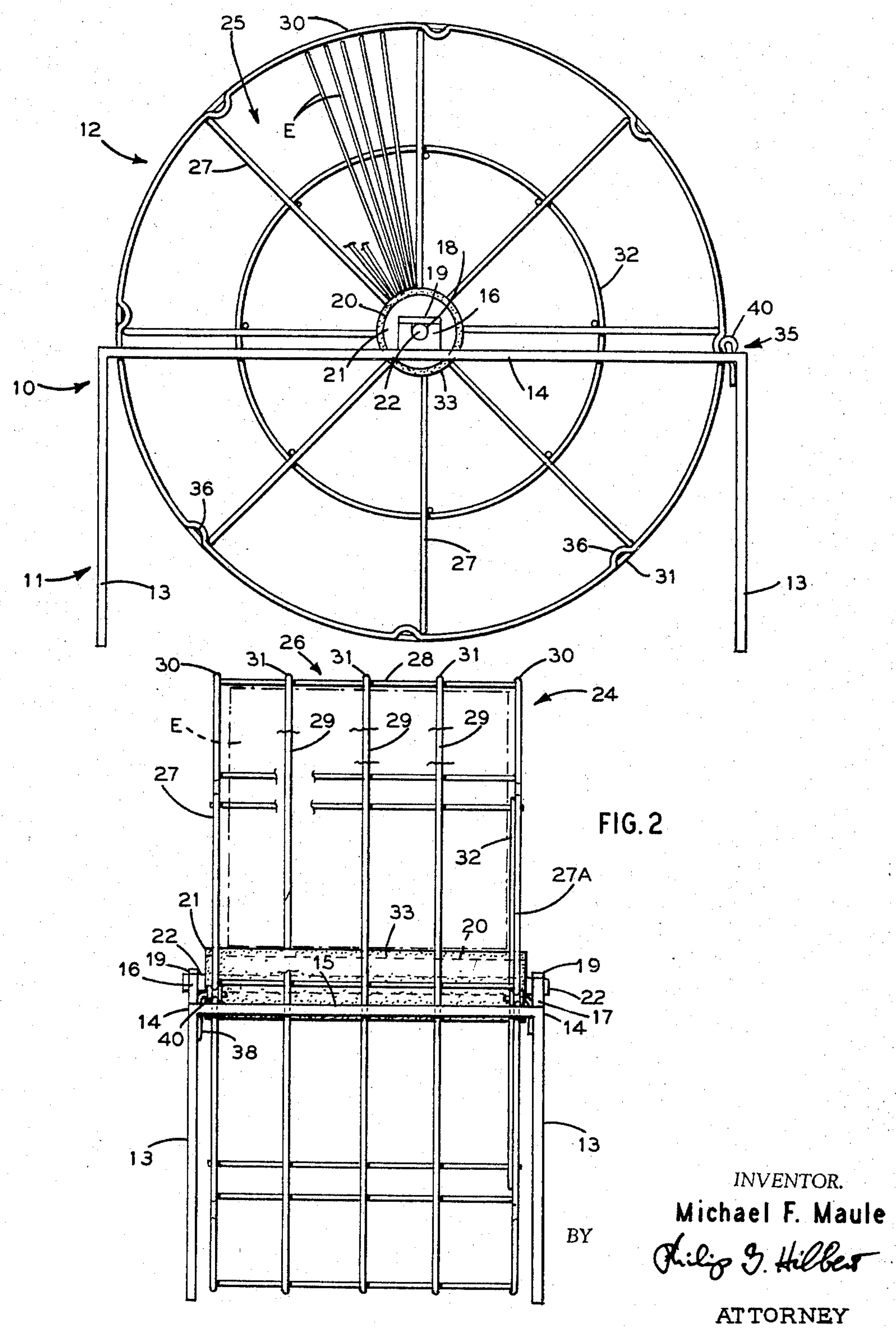
FIG. 1 is a side elevational view showing a phonograph record holder embodying the invention.
FIG. 2 is an end elevational view thereof looking at the right hand end of FIG. 1.
Figure 3:
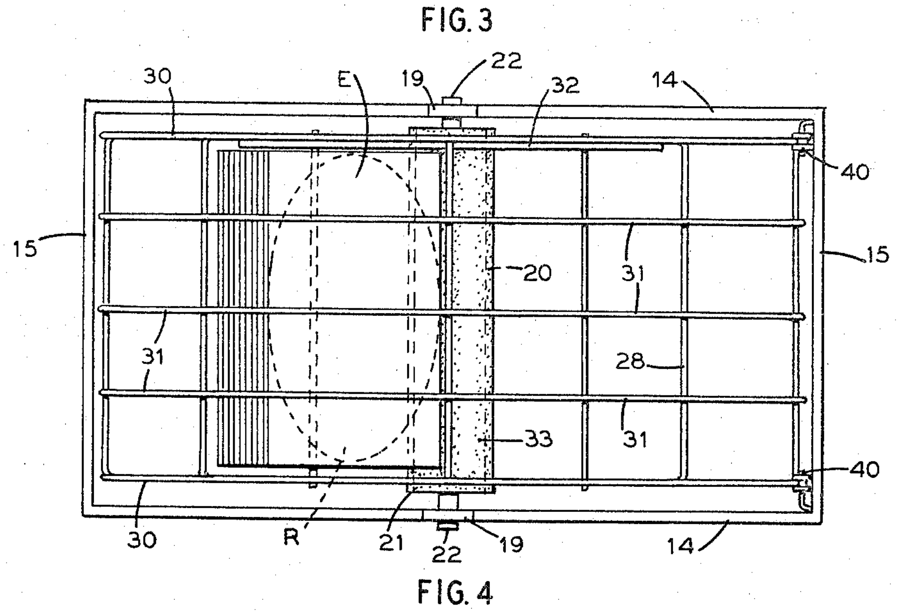
FIG. 3 is a plan view thereof.

Referring in detail to the drawing, 10 designates a phonograph record holder embodying the invention, which is adapted to store for retrieval conventional phonograph records R which are enclosed in the usual individual envelopes or albums E formed of cardboard, paper and the like. Such envelopes are of square outline, measuring slightly more then 12" or 7" on a side in accordance with the type of record enclosed therein.

The holder 10 comprises support means generally indicated at 11, and record receiving and storing compartment means generally indicated at 12, the same being mounted for rotation on support means about a horizontal axis. Thus, the compartment means 12 may be located at a suitable, readily accessible level, for inserting and removing records R in their envelope E.

Support means 11 comprises four leg members 13 in quadrangular arragement and interconnected at their top ends by a pair of opposed side members 14 and a pair of opposed end members 15. At the mid portions of side members 14 there are affixed opposed bearing plates 16, 17 which are formed with upwardly opening bearing grooves 18. Pivoted latches 19 close the open ends of grooves 18.

The compartment means 12, of generally cylindrical shape is mounted for rotation on support means 11, the axis thereof being parallel to end members 15. Compartment means 12 comprises a cylindrical hub member 20, formed of plastic or the like, the opposite ends thereof being closed by discs 21. The hub member 20 has an outside diameter suitably proportioned to the desired record capacity of holder 10. Stub shafts 22 project outwardly from the axial portions of discs 21 and are journalled in the grooves 18 of bearing plates 16, 17; latches 19 being opened and then closed to retain compartment means 12 in position on support means 11, for rotation about a horizontal axis.

Compartment means 12 further includes an open frame work structure generally indicated at 24 which is fixed to hub member 20 and provides a plurality of radially disposed record holding compartments generally indicated at 25. Frame structure 24 is constituted of spaced wire members which form compartments 25, yet said compartments are open to view from the top or side portions thereof.

Thus, frame structure 24 comprises a series of inverted U shaped wire members 26 having parallel legs 27, 27A interconnected by a rectilinear portion 28. The members 26 are arranged about hub member 20 in circumferentially spaced positions, the free ends of legs 27, 27A being suitably secured to opposite end portions of said hub member 20, by embeddment or the like. A plurality of parallel wire strut members 29 are fixed at their outer ends to portion 28 of members 26, the inner ends thereof being fixed to hub member 20 by embeddment or the like, thus forming a series of radially extending, angularly related openwork walls, which extend lengthwise of hub member 20.

The compartments 25 have outer openwork wall portions defined by a pair of wire members 30 in circular form, which interconnect the frame members 24. Members 30 extend at right angles to the compartment walls formed by members 26 and wire struts 29, and are secured to the corners thereof at the juncture of legs 27, 27A with rectilinear portion 28. Additional wire members 31 in circular form extend transversely of wire portions 28 and are affixed thereto at longitudinally spaced intervals.

A stop member at one end of compartments 25 is provided in the form of a wire member 32 in circular form and of a diameter less than that of members 30, 31; which is affixed to intermediate portions of legs 27A of members 26, as by solder or the like.

It will be apparent that there is provided in member 12, a plurality of compartments 25 extending radially from hub members 20, for receiving therein records R in their envelopes or albums E, which are introduced endwise into the compartments at the open ends thereof, the stop member 32 limiting the movement thereof in a direction parallel to the axis of hub member 20.

A limited number of records R are inserted into each compartment 25, so that the same may be angularly displacable relative to each other within the compartment. Thus, the individual records R may be manually manipulated while still in the compartments, to facilitate the view through the framework 24 and the selection of the desired record.

Preferably, the outer surface of hub member 20 is covered with a layer of felt, sponge rubber or other cushioning material, as at 33. Since the radial dimensions of the framework 24 are such as to accommodate the records R in their envelopes E, with the bottom edges of said envelopes seating on layer 33 and the top edges thereof abutting or closely approaching the frame members 30, 31; the layer 33 is effective to compensate for slight differences in the dimensions of envelopes E and thereby avoid excessive clearance between the envelopes E and the frame members 30, 31.

Thus, compartment means 12 may be readily rotated on support 11, to bring a particular compartment 25 to a desired level or position; and while at such level or position, the records R therein may be displaced from each other to readily expose indicia on the envelopes thereof so as to quickly identify a desired record. The selected record in its envelope E may then be extracted from its compartment 25. The selected record after use may be easily restored to its compartment 25 on rotating holder 12 to bring the appropriate compartment 25 to a proper level or angular position.

Figure 4:
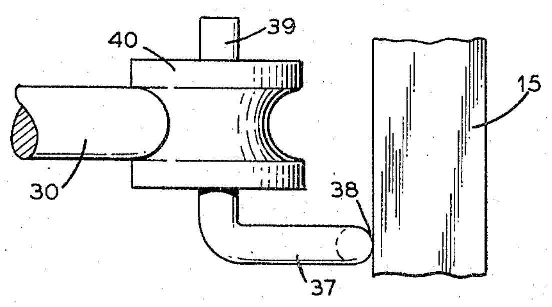
FIG. 4 is a plan view showing a detent portion of the construction.
Figure 5:
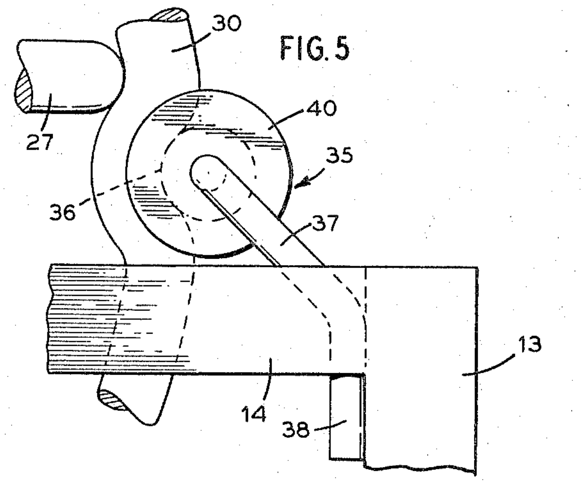
FIG. 5 is an elevational view thereof.

Means is provided for holding the compartment means 12 in a desired angular positon, thereby facilitating the removal or insertion of a record R in its envelope E, in respect to a selected compartment 25 by leaving the hands free to hold and manipulate said record R. To this end detent means generally indicated at 35 is provided, as shown in FIGS. 4, 5.

Detent means 35 comprises a series of circumferentially spaced, inwardly directed radial depressions 36 formed in frame members 30. Further, there are provided springy members 37 affixed at lower portions 38 thereof to the upper ends of legs 13. The members 37 are angularly directed towards frame members 30 and terminate in shaft portions 39 which extend transversely of frame members 30 and are located adjacent thereto. Pulleys 40 rotatably mounted on shaft portions 39 are spring pressed toward frame members 30 which are received in the grooves thereof.

When compartment means 12 is positively rotated on shafts 22, the pulleys 40 will snap into and out of the successive depressions 36 in frame members 30. However, on reducing the turning force applied to compartment means 12, the pulleys 40 act as stop means when snapped into selected depressions 36 on frame members 30, thereby allowing the compartment means 12 to be stopped and retained in a selected angular position thereof. It follows that a selected compartment 25 is thus located at a desired level, permitting convenient withdrawal or insertion of a record R in its envelope E relative to said compartment.

As various changes could be made in the embodiment of the invention herein disclosed without departing from the spirit thereof, it is understood that all matter herein shown or described shall be deemed illustrative and not limiting except as set forth in the appended claims.

I claim:

1. A phonograph record holder comprising support means and record holder means mounted on said support means for rotation about a horizontal axis, said holder means comprising a hub member, means for rotatably mounting opposite end portions of said hub member on said support means, an open framework structure extending radially outward from said hub member, said structure including radially extending portions and portions radially displaced from said hub member and associated with said hub member to form a plurality of radially extending compartments, each of said compartments being open at one end thereof for introducing phonograph records therethrough in a direction parallel to the longitudinal axis of said hub member, said records being received within said compartments and angularly displaceable relative to each other within each compartment for viewing through said open framework structure.

2. A record holder as in claim 1 and further including cooperative means on said support means and said holder means for retaining said holder means in selected angular positions thereof relative to said support means.

3. A record holder as in claim 1 wherein said framework structure comprises a plurality of inverted U-shaped members extending parallel to the longitudinal axis of said hub member and being respectively fixed to said hub member at circumferentially spaced points thereon, said U-shaped members extending radially outward of said hub member and in angularly displaced relation to each other, and frame portions interconnecting the outer portions of said U-shaped members.

4. A record holder as in claim 3 wherein said frame portions comprises a plurality of laterally spaced, circular members having circumferentially spaced portions thereof fixed to opposed portions of said U-shaped members.

5. A record holder as in claim 4 and further including stop means fixed to said U-shaped members at one end thereof for limiting the movement of the records inserted into said compartments.

6. A record holder as in claim 1 and further including cushioning means on the outer surface portions of said hub member for receiving the inner edge portions of said records.

7. A record holder as in claim 1 wherein said framework structure comprises a plurality of series of wire members, the wire members of each series being in a common plane and in spaced relation, said series of wire members extending radially from said hub member at circumferentially spaced, longitudinally extending outer surface portions thereof, and wire means interconnecting outer end portions of said series of wire members and extending at right angles to the planes of said series of wire members.

8. A record holder as in claim 1 wherein said support means comprises leg means and horizontally disposed support members interconnecting the upper ends of said leg means, bearing means on opposed support members, and axial shaft means projecting from opposite ends of said hub member and journalled on said bearing means.

References Cited

UNITED STATES PATENTS

| | | | |
|---|---|---|---|
| 2,498,028 | 2/1950 | Clerc | 312—305 |
| 2,541,185 | 2/1951 | Adams | 312—305 X |
| 2,975,014 | 3/1961 | Dahl | 312—305 |
| 3,170,741 | 2/1965 | Richards | 211—40 X |
| 3,347,393 | 10/1967 | Frey | 312—10 X |

BOBBY R. GAY, *Primary Examiner.*

JAMES L. KOHNEN, *Assistant Examiner.*